(12) United States Patent
Arnault et al.

(10) Patent No.: US 9,702,409 B2
(45) Date of Patent: Jul. 11, 2017

(54) BEARING HAVING OVERMOULDED WEAR RACE, AND ASSOCIATED MANUFACTURING METHOD

(71) Applicants: Benoit Arnault, Saint-Cyr-sur-Loire (FR); Philippe Walter, Fondettes (FR)

(72) Inventors: Benoit Arnault, Saint-Cyr-sur-Loire (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/075,884

(22) Filed: Mar. 21, 2016

(65) Prior Publication Data
US 2016/0281782 A1 Sep. 29, 2016

(30) Foreign Application Priority Data
Mar. 24, 2015 (FR) .................................. 15 52435

(51) Int. Cl.
| | |
|---|---|
| *F16C 33/58* | (2006.01) |
| *F16C 19/16* | (2006.01) |
| *F16C 43/04* | (2006.01) |
| *F16D 23/14* | (2006.01) |

(52) U.S. Cl.
CPC .......... *F16C 33/586* (2013.01); *F16C 19/163* (2013.01); *F16C 43/04* (2013.01); *F16D 23/143* (2013.01); *F16C 2361/43* (2013.01); *F16D 23/14* (2013.01)

(58) Field of Classification Search
CPC ...... F16C 33/586; F16C 19/163; F16C 23/14; F16C 23/143
See application file for complete search history.

(56) References Cited

U.S. PATENT DOCUMENTS

| | | | | |
|---|---|---|---|---|
| 4,969,755 | A * | 11/1990 | Parzefall ................. | F16D 23/14 192/110 B |
| 8,286,775 | B2 * | 10/2012 | Winkelmann ........ | F16C 19/163 192/110 B |
| 2008/0210515 | A1 | 9/2008 | Winkelmann | |
| 2015/0308516 | A1 * | 10/2015 | Arnault ................... | F16D 23/14 192/110 B |
| 2015/0377292 | A1 * | 12/2015 | Arnault ................. | F16C 33/586 384/564 |

FOREIGN PATENT DOCUMENTS

| | | |
|---|---|---|
| DE | 10125691 A1 | 7/2002 |
| DE | 102004034439 A1 | 2/2006 |
| FR | 2887312 A1 | 12/2006 |
| WO | 2012153161 A1 | 11/2012 |

* cited by examiner

*Primary Examiner* — Thomas R. Hannon
(74) *Attorney, Agent, or Firm* — Bryan Peckjian; SKF USA Inc. Patent Dept.

(57) ABSTRACT

The bearing provides an inner race, an outer race and a wear race that is made of synthetic material and fastened to one of the races. The wear race is overmoulded on at least one face of the race. The face is provided with at least one blind indentation, inside of which there extends a rib of complementary shape of the wear race.

8 Claims, 5 Drawing Sheets

BEARING HAVING OVERMOULDED WEAR RACE, AND ASSOCIATED MANUFACTURING METHOD

CROSS-REFERENCE TO RELATED APPLICATIONS

This is a Non-Provisional Patent Application, filed under the Paris Convention, claiming the benefit of French (FR) Patent Application Number 1552435, filed on 24 Mar. 2015, which is incorporated herein by reference in its entirety.

FIELD OF THE INVENTION

The present invention relates to the field of rolling bearings, notably that of rolling bearings used in clutch release bearing devices intended to act on the diaphragm of a clutch, in particular for a motor vehicle.

BACKGROUND OF THE INVENTION

Such devices provide a rolling bearing, one of the races of which turns and the other of which is fixed, the turning race being provided with a radial leading surface intended to come into contact with the end of the fingers of the diaphragm of the clutch.

A non-turning operating element supports the rolling bearing and, when acted on by a (mechanical, electrical or hydraulic) control element, moves the bearing axially so as to cause the leading surface of the turning race to press against the diaphragm of the clutch and to actuate the clutch mechanism.

In order to limit friction wear between the fingers of the diaphragm and the turning race during clutch engagement and release operations, it is possible to fasten a wear race made of polymeric material to the turning race. For more details relating to such a wear race, reference may be made for example to patent application FR-A1-2 887 312.

In the bearing described in this earlier document, a plate crimped onto the turning race is provided to ensure retention of the wear race on the race. However, this solution has the drawback of increasing the number of components of the bearing to be manufactured, stored and assembled.

The present invention aims to remedy this drawback.

BRIEF SUMMARY OF THE INVENTION

More specifically, the present invention aims to provide a bearing for a clutch release bearing device that involves a number of components that is smaller and easy to manufacture.

The present invention also aims to provide a bearing that exhibits good operational reliability.

In one embodiment, the bearing provides an inner race, an outer race and a wear race that is made of synthetic material and fastened to one of the races. The wear race is overmoulded on at least one face of the race. The face is provided with at least one blind indentation, inside which there extends a rib of complementary shape of the wear race. Alternatively or in combination, the face of the race is provided with at least one protruding protuberance that fits into a recess of complementary shape of the wear race.

The overmoulding of the wear race on the race ensures that these two races are secured together properly. Moreover, the indentation and/or the protuberance ensure axial and/or angular retention of the wear race relative to the race. The risk of axial and/or rotational detachment of the wear race from the race is limited.

The blind indentation may provide an end wall that is set back with respect to the face of the race, and two side edges that delimit the indentation in the circumferential direction. The protuberance may provide an external surface that is offset towards the outside with respect to the face of the race, and two side edges that delimit the protuberance in the circumferential direction.

The blind indentation, and/or the protuberance, may be obtained by local deformation of the material of the race.

Preferably, at least one axial retention means is formed on the face of the race in order to axially retain the wear race relative to the race by shape complementarity.

In one embodiment, the axial retention means is separate from the blind indentation and/or from the protuberance. The axial retention means may provide an annular groove, inside which there extends an annular lip of the wear race of complementary shape.

Alternatively, the blind indentation, and/or the protuberance, forms the axial retention means.

The blind indentation can be formed on the external face or on the internal face of the race, being produced in one piece with the race. Alternatively or in combination, the protruding protuberance can be formed on the external face or on the internal face of the race, being produced in one piece with the race.

The invention also relates to an assembly comprising a bearing as defined above and an operating element supporting the bearing. The assembly may be a clutch release bearing device. The assembly may also be a motor vehicle comprising the clutch release bearing device.

The invention also relates to a method for manufacturing a bearing of the type comprising an inner race and an outer race, wherein a wear race is fastened to one of the races. At least one blind indentation, and/or at least one protruding protuberance, is formed locally on one face of the race. The wear race is overmoulded on the face so as to form on the wear race by shape complementarity at least one rib that extends inside the indentation, and/or at least one recess inside which the protuberance extends.

BRIEF DESCRIPTION OF THE SEVERAL VIEWS OF THE DRAWING

The present invention will be better understood from reading the detailed description of embodiments which are given by way of entirely non-limiting examples and are illustrated by the appended drawings, in which.

DETAILED DESCRIPTION OF THE INVENTION

Figure 1:
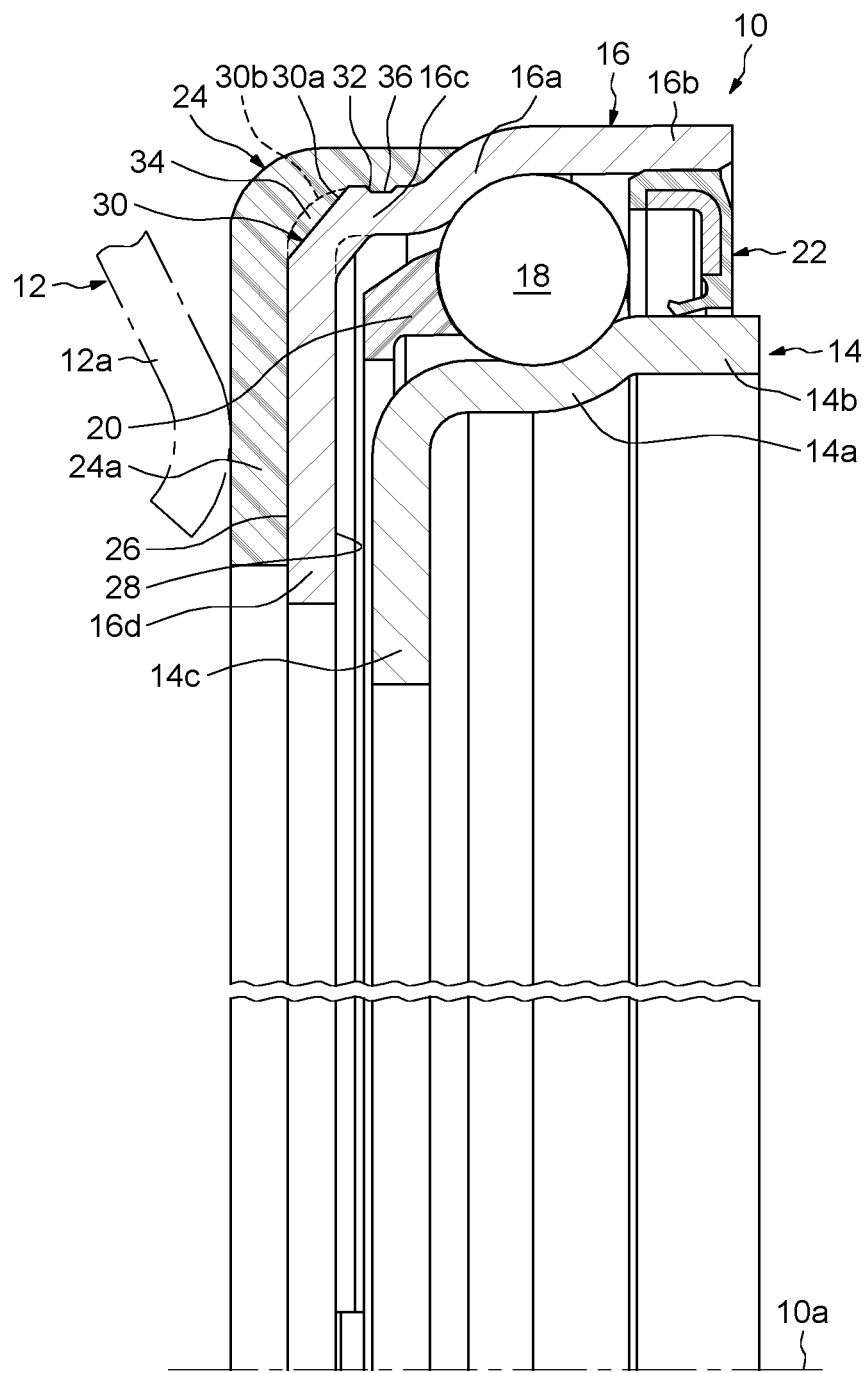
FIG. 1 is a half-view in axial section of a rolling bearing according to a first exemplary embodiment of the invention.
Figure 2:
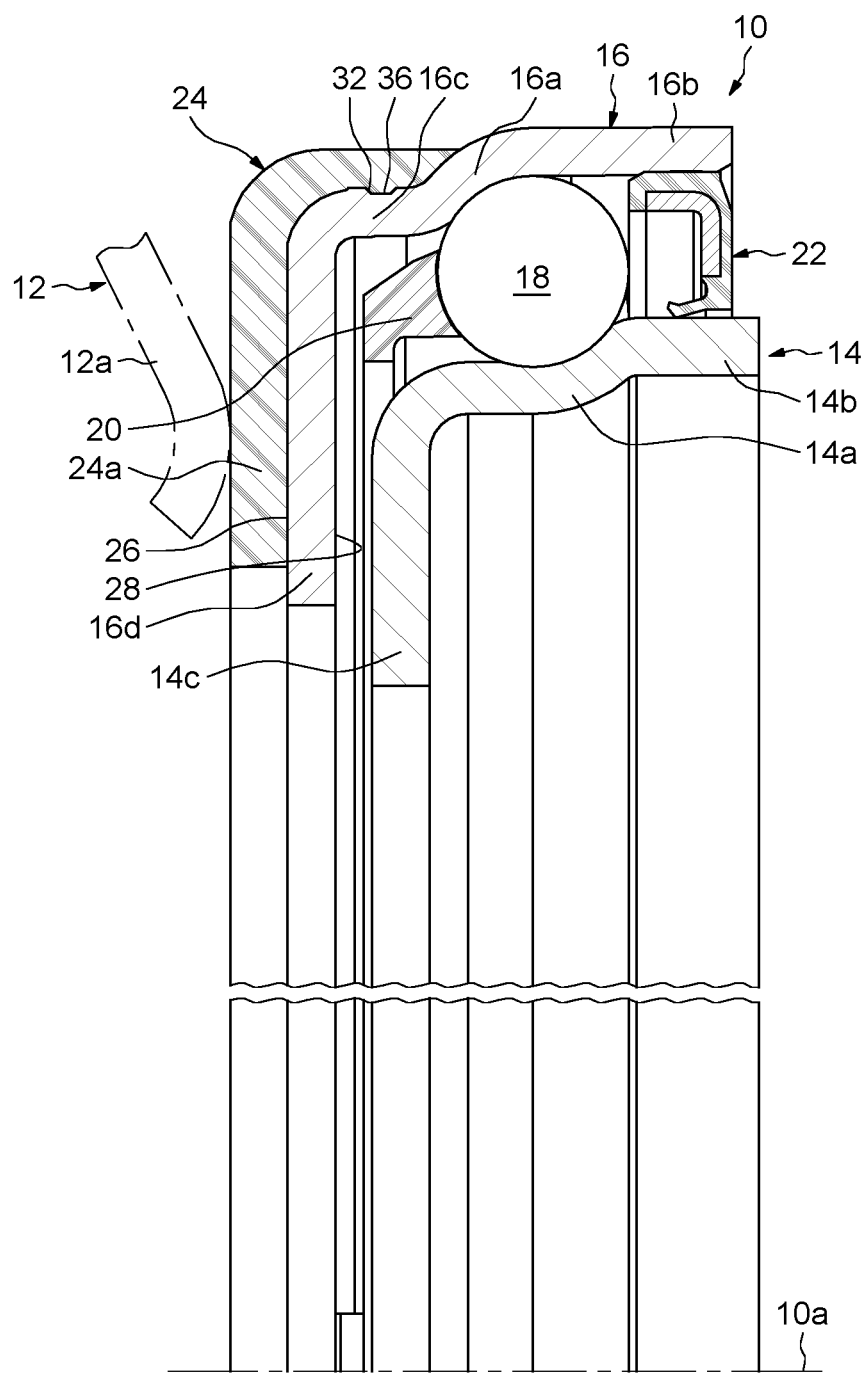
FIG. 2 is a half-view in axial section of the bearing from FIG. 1 along a different line of section.

In FIGS. 1 and 2, a rolling bearing, with the overall reference 10, is intended to be used in a clutch release bearing device provided to act on the diaphragm 12 of a clutch, in particular for a motor vehicle. In the figures, the diaphragm 12 is illustrated in part and shown in broken lines. The diaphragm 12 provides a plurality of fingers 12a spaced apart in the circumferential direction. The rolling bearing 10 is intended to be mounted on an operating element (not shown) of the associated clutch release bearing device and is provided so as to be moved axially.

The rolling bearing 10, of axis 10a, provides a non-turning inner race 14, a turning outer race 16, a row of rolling elements 18 that are produced, here, in the form of balls and are disposed radially between the raceways provided on the races, a cage 20 for maintaining the regular circumferential spacing of the rolling elements 18, and an annular seal 22 fastened to the outer race. A rolling space (not referenced) is delimited radially between the inner race 14 and outer race 16. Inside the rolling space, the rolling elements 18 and the associated maintaining cage 20 are housed.

As will be described in greater detail below, the bearing 10 further provides a wear race 24 overmoulded on the outer race 16 and provided to come axially into contact with the diaphragm 12 of the clutch.

The thin-walled inner race 14, of axis 10a, may advantageously be made by pressing a plate made, for example, of steel. The inner race 14 is made in one piece.

The inner race 14 provides a toroidal portion 14a having in cross section a quarter-circle concave internal profile that forms the track or raceway of the race for the rolling elements 18. The inner race 14 also provides an annular axial portion 14b that extends a large-diameter edge of the toroidal portion 14a axially away from the outer race 16. The inner race 14 also provides an annular radial portion 14c that extends a small-diameter edge of the toroidal portion 14a and extends radially inwards. The radial portion 14c is situated axially away from the axial portion 14b with respect to the toroidal portion 14a.

The thin-walled outer race 16, of axis 10a, can also be advantageously made by pressing a plate made, for example, of steel. The outer race 16 is made in one piece. The outer race 16 provides a toroidal portion 16a having in cross section a quarter-circle concave internal profile that forms the track or raceway of the race for the rolling elements 18. The toroidal portion 16a is extended at either end by annular axial portions 16b, 16c. The axial portion 16b extends a large-diameter edge of the toroidal portion 16a and radially surrounds the toroidal portion 14a of the inner race.

The axial portion 16c extends a small-diameter edge of the toroidal portion 16a axially away from the axial portion 16b. The outer race 16 also provides an annular radial portion 16d that extends the axial portion 16c radially inwards.

The outer race 16 provides an external face 26 which is oriented towards the outside of the bearing, i.e. on the side opposite the rolling elements 18, and against which the wear race 24 is mounted so as to bear. The external face 26 is formed by the outer surface of the portions 16a to 16c of the outer race and the front surface of the radial portion 16d which is oriented on the same side as the diaphragm 12. The outer race 16 also provides an internal face 28 which is oriented towards the inside of the bearing, i.e. on the same side as the rolling elements 18. The external face 26 and internal face 28 delimit the thickness of the outer race. The internal face 28, away from the external face 26, is formed by the bore of the portions 16a to 16c of the outer race and the front surface of the radial portion 16d which is oriented on the same side as the rolling elements 18.

Figure 3:
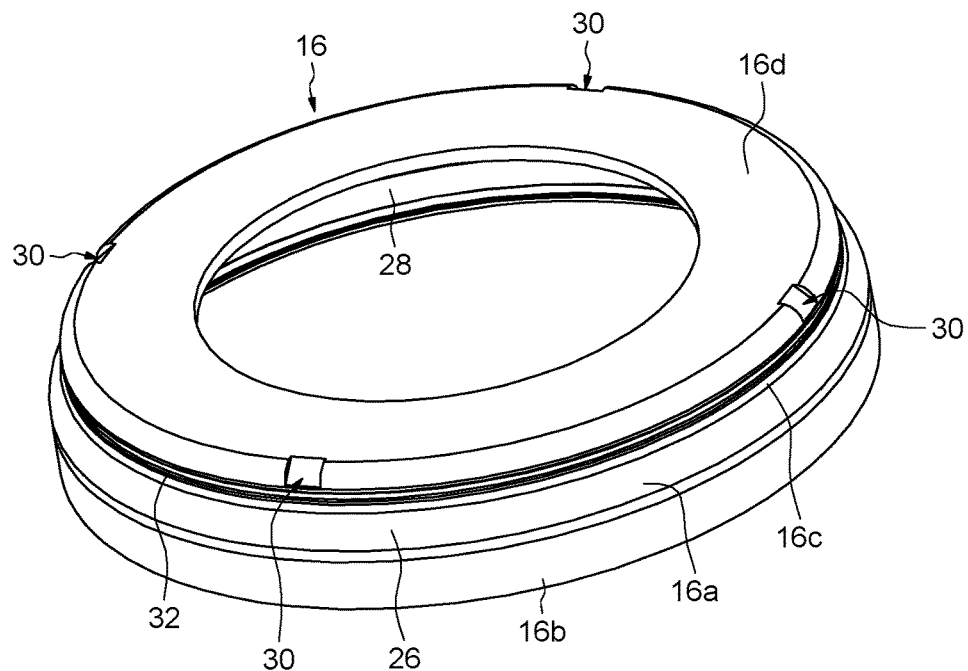
FIG. 3 is a perspective view of an outer race of the bearing from FIGS. 1 and 2.

As illustrated more clearly in FIG. 3, the outer race 16 provides a plurality of blind indentations 30 formed on the external face 26. The indentations 30 are formed here in the zone in which the radial portion 16d is connected to the axial portion 16c. In the exemplary embodiment illustrated, the indentations 30 are identical to one another. In a variant, the indentations can be different from one another. The indentations 30 are spaced apart from one another in the circumferential direction, in this case in a regular manner In the exemplary embodiment illustrated, there are four of the indentations 30. In a variant, it is possible to provide a different number of indentations, for example one, two or three or even five or more.

Each indentation 30 extends radially from the external face 26 of the outer race. Each indentation 30 extends through the thickness of the outer race without opening onto the internal face 28 of the race away from the external face. The indentations 30 do not pass through the thickness of the outer race 16. Each indentation 30 locally forms a cavity that extends in a set-back manner from the external face 26 of the outer race in the direction of the internal face 28. Each indentation 30 extends through a limited angular sector, for example between 5° and 10°.

Figure 4:
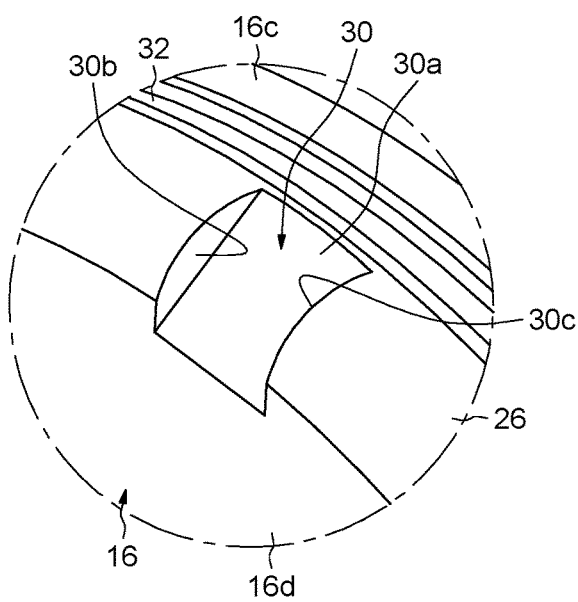
FIG. 4 is a detail view of FIG. 3.

As illustrated more clearly in FIG. 4, each indentation 30 provides an end wall 30a that is offset towards the inside with respect to the external face 26 of the outer race, and two opposite side edges 30b, 30c that delimit the end wall and the indentation in the circumferential direction. The side edges 30b, 30c connect the end wall 30a to the external face 26. The side edges 30b, 30c are set back with respect to the external face 26. Each indentation 30 is connected on one side to the radial portion 16d and on the other side to the axial portion 16c. In the exemplary embodiment illustrated, the forward and rear edges (not referenced) of each indentation 30 are flush with the external face 26 of the outer race. These edges do not protrude with respect to the external face 26. Alternatively, each indentation 30 could be delimited in the axial direction by two, forward and rear, edges that protrude with respect to the external face 26.

In the exemplary embodiment illustrated, the outer race 16 also provides an annular groove 32 provided in the axial portion 16c and directed radially outwards. In a variant, it could be possible to provide, instead of the annular groove, a plurality of grooves in the form of sectors spaced apart from one another in the circumferential direction. In another variant, it may be possible for the outer race 16 not to have a groove or such grooves.

Referring again to FIGS. 1 and 2, the seal 22 is fastened to the outer race 16 and forms a dynamic seal with the inner race 14. A "dynamic seal" is understood to mean a seal between two parts in relative motion. The seal 22 is fastened in this case in the bore of the axial portion 16b of the outer race and rubs against the outer surface of the axial portion 14b of the inner race.

The wear race 24 is provided to interact by contact with the diaphragm 12. The wear race 24 is produced in one piece. The wear race 24 is made of a synthetic material. By way of illustration, the wear race 24 can be made for example of unfilled polyamide or polyamide filled with mineral fibres or carbon.

The wear race 24 provides an annular body 24a mounted so as to bear against the external face 26 of the outer race 16. The body 24a partially covers the external face 26. In the exemplary embodiment illustrated, the body 24a covers the radial portion 16d, the axial portion 16c and the toroidal portion 16a of the outer race on the outer side of the bearing. The body 24a delimits a front leading or pressing surface provided to interact axially by contact with the fingers 12*a* of the diaphragm. The diaphragm 12 comes to bear against the body 24*a* of the wear race axially on the side opposite the outer race 16.

As indicated above, the wear race 24 is overmoulded on the outer race 16. This results in excellent securing of these two parts, this being reinforced by virtue of the indentations 30 in the outer ring, into each of which the synthetic material of the wear race passes during overmoulding. During overmoulding, a plurality of ribs 34 (FIG. 1) having shape complementarity with the indentations 30 are formed on the wear race 24. The ribs 34 are formed in this case in the bore of the wear race 24. The ribs 34 extend inwards from the bore.

Each rib 34 fits into the associated indentation 30. Each rib 34 covers the end wall 30*a* and the side edges 30*b*, 30*c* of the associated indentation. The side edges 30*b*, 30*c* of each indentation that are covered with the synthetic material of the wear race 24 ensure the angular retention of the wear race 24 with respect to the outer race 16. The side edges 30*b*, 30*c* form edges for immobilizing the wear race 24 or preventing it from rotating.

Furthermore, the groove 32 in the outer race is also filled with the synthetic material of the wear race 24 during overmoulding. During the overmoulding of the wear race 24, an annular protuberance or lip 36 is formed in the bore of the race and fits inside the groove 32. The lip 36 extends inwards from the bore. The axial retention of the wear race 24 on the outer race 16 is favoured by shape complementarity between the annular coupling lip 36 of the wear race and the groove 32 in the outer race. The groove 32 helps to prevent extraction of the wear race 24 relative to the outer race 16.

In order to produce the assembly of the wear race 24 on the outer race 16, the procedure is as follows. First of all, the indentations 30 are formed in the outer race 16. Preferably, the indentations 30 are formed by spinning material without removing chips so as to locally bring about, on the external face 26, a flow of material inwards in the direction of the internal face 28. The indentations 30 are obtained by local plastic deformations of the external face 26 of the outer race. The indentations 30 and the groove 32 are preferably formed during pressing operations provided to produce the outer race 16. Next, during a subsequent step, the wear race 24 is overmoulded on the outer race 16 so as to form the ribs 34 and the lip 36, as indicated above.

Figure 5:
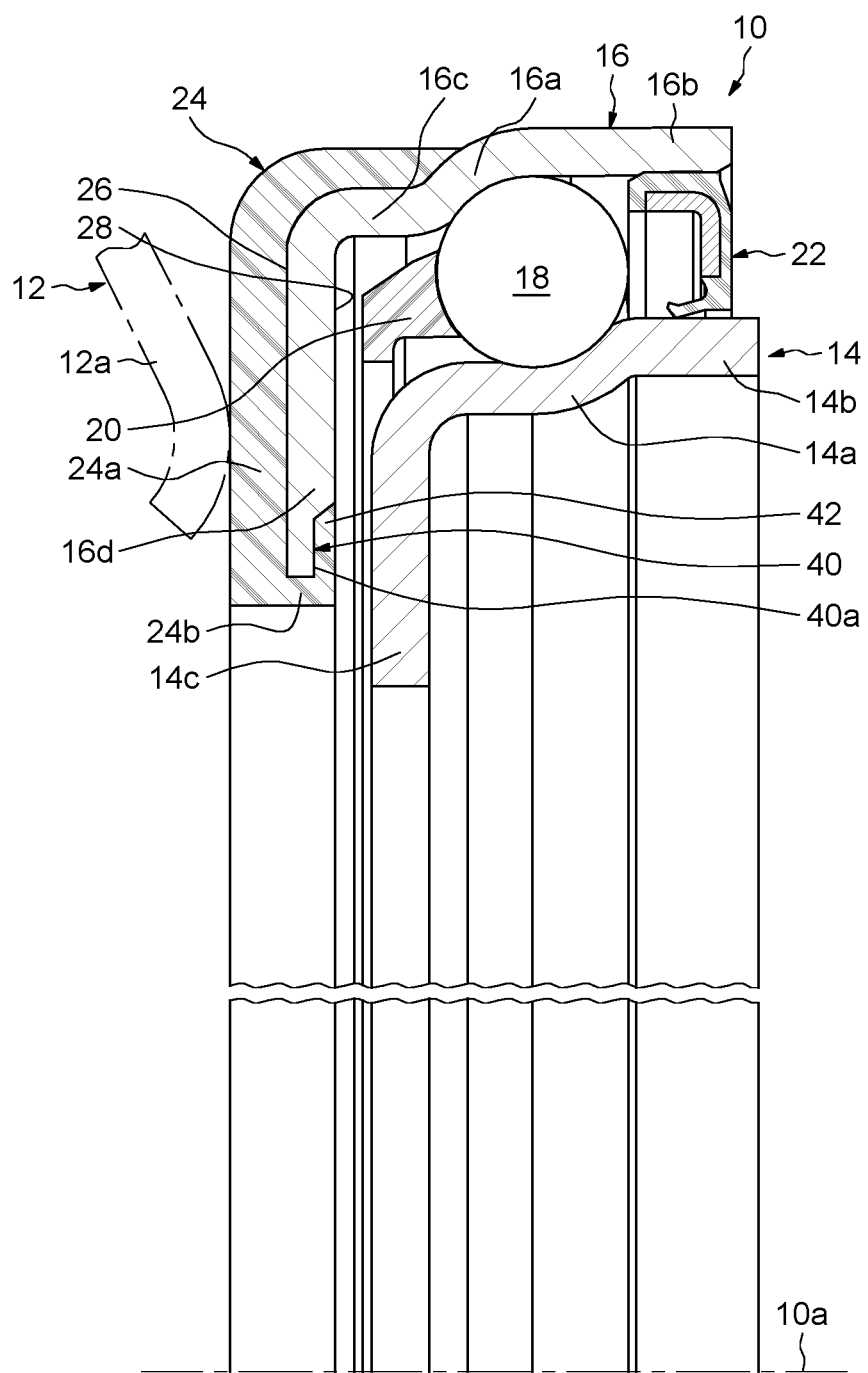
FIG. 5 is a half-view in axial section of a rolling bearing according to a second exemplary embodiment of the invention.
Figure 6:
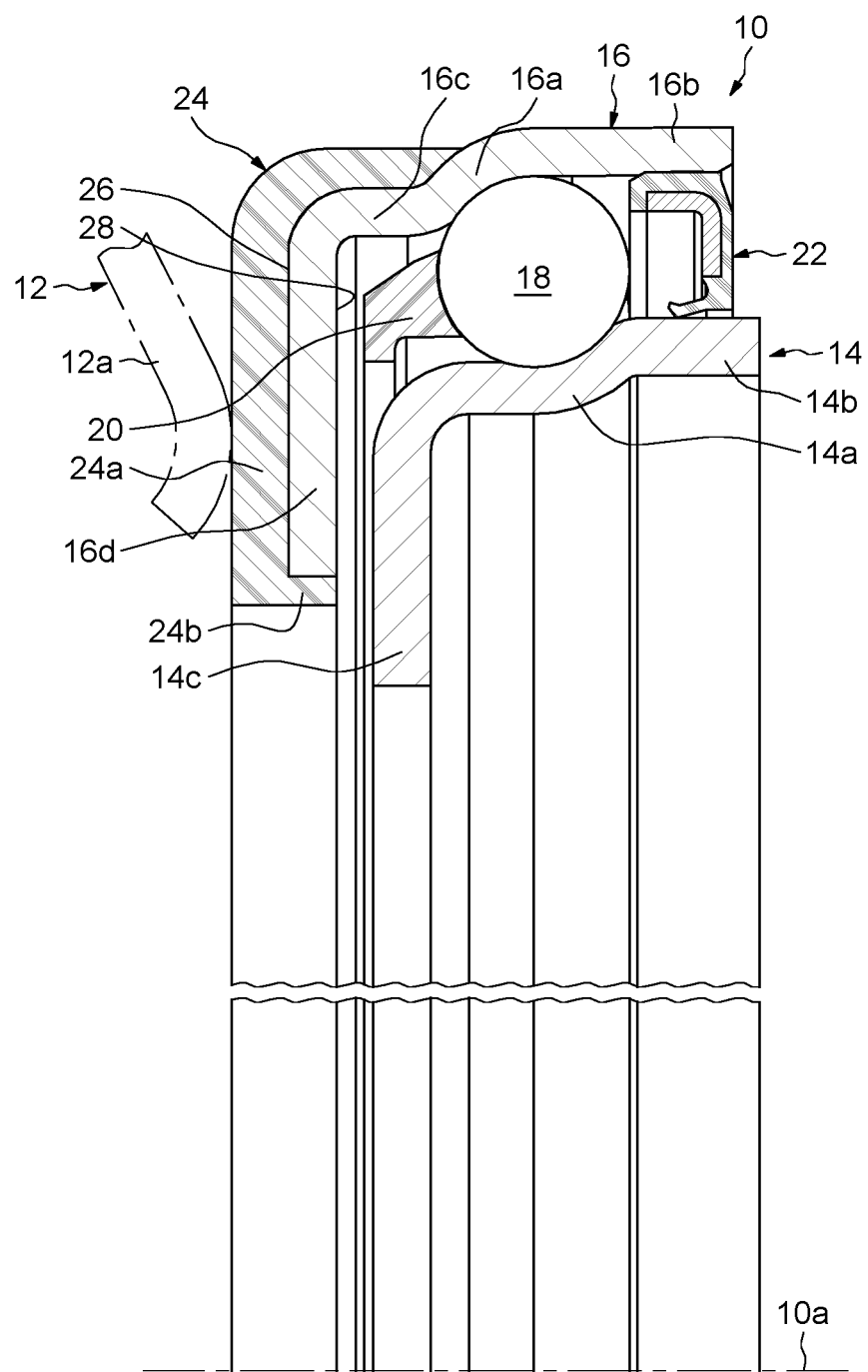
FIG. 6 is a half-view in axial section of the bearing from FIG. 5 along a different line of section.

The exemplary embodiment illustrated in FIGS. 5 and 6, in which identical elements bear the same references, differs from the first example described mainly in that the outer race 16 provides a plurality of blind indentations 40 formed on the internal face 28. The indentations 40 are provided in the radial portion 16*d* of the outer race. The indentations 40 are identical to one another. The indentations 40 are spaced apart from one another in the circumferential direction, preferably in a regular manner There can be four of the indentations 40. In a variant, it is possible to provide a different number of indentations, for example one, two or three or even five or more.

Each indentation 40 extends from the internal face 28 of the outer race. Each indentation 40 extends through the thickness of the outer race without opening onto the external face 26 of the race away from the internal face. The indentations 40 extend in this case axially through the thickness of the outer race 16. The indentations 40 do not pass through the thickness of the outer race 16. Each indentation 40 locally forms a cavity that extends in a set back manner from the internal face 28 of the outer race in the direction of the external face 26. Each indentation 40 extends through a limited angular sector, for example between 5° and 10°.

Each indentation 40 provides an end wall 40*a* that is offset towards the outside with respect to the internal face 28 of the outer race. In a similar manner to the first exemplary embodiment described, each indentation 40 also provides two opposite side edges (not shown) that delimit the end wall 40*a* and the indentation in the circumferential direction. In the exemplary embodiment illustrated, the indentations 40 open into the bore of the outer race. The indentations 40 can for example be formed by a counterbore.

In this exemplary embodiment, the wear race 24 also provides an annular internal centring part 24*b* that extends the body 24*a* inwards and makes it possible to centre the wear race with respect to the outer race 16. The centring part 24*b* of annular shape axially extends a small-diameter edge of the body 24*a*. The centring part 24*b* comes to be centred in the bore of the outer race 16. The centring part 24*b* has an outer surface in radial contact with the bore. The centring part 24*b* is mounted in the bore of the radial portion 16*d* of the outer race.

The wear race 24 also provides a plurality of ribs 42 (FIG. 5) having shape complementarity with the indentations 40. The ribs 42 extend the end of the centring part 24*b* radially outwards. The ribs 42 are formed during the overmoulding of the wear race 24. Each rib 42 fits into the associated indentation 40. Each rib 42 covers the end wall 40*a* and the side edges of the associated indentation 40. The side edges of each indentation 40 that are covered with the synthetic material of the wear race 24 ensure the angular retention of the wear race 24 with respect to the outer race 16.

Moreover, the end wall 40*a* of each indentation against which the associated rib 42 comes to bear axially ensures the axial retention of the wear race 24 on the outer race 16. In this exemplary embodiment, the same means formed on the outer ring 16, namely the indentations 40, makes it possible to realize the double function of axial retention and angular retention of the wear race 24 relative to the outer race 16. In the first exemplary embodiment described, this double function is realized by two separate means of the outer race 16, the indentations 30 and the groove 32.

In one variant embodiment, it is possible to provide, instead of the plurality of indentations 40, a single indentation of annular shape, inside which an annular protuberance of the wear race is fitted. In such a variant, the annular indentation only ensures the axial retention of the wear race 24 on the outer race 16.

In the exemplary embodiments illustrated, a blind indentation is formed either on the external face or on the internal face of the outer race. Alternatively, it may be possible to provide at least one blind indentation on each of the internal and external faces. It is for example possible to combine the two embodiments described above so as to have indentations both on the external face and on the internal face of the outer race. It may be possible to provide an alternate disposition of the blind indentations on the external face and the blind indentations on the internal face of the outer race. In a variant, it is also possible to dispose each blind indentation on the external face in the same axial plane as one of the blind indentations on the internal face so as to locally obtain regions with a reduced thickness for the outer race.

Alternatively or in combination, the external face or the internal face of the outer race may provide at least one protuberance that protrudes with respect to the face and provides an external surface that is offset towards the outside with respect to the face and two opposite side edges that delimit the external surface and the rib in the circumferential direction. In this case, during the overmoulding of the wear race, at least one recess is formed in the bore of the wear race, inside which the protuberance on the outer race of complementary shape fits. The protuberance is embedded in the synthetic material of the wear race.

The invention has been illustrated on the basis of a rolling bearing in which the wear race is overmoulded on the outer race. In a variant, the wear race can be overmoulded on the inner race when the inner race is provided so as to turn. The invention has been illustrated on the basis of a rolling bearing provided with a first race, a second race and at least one row of rolling elements disposed between the races. In a variant, the bearing could be a plain bearing or a swivel.

The invention claimed is:

1. A bearing comprising:
    an inner race,
    an outer race comprising an internal face oriented towards an inside of the bearing and an external face oriented towards an outside of the bearing, the internal face and the external face delimiting a thickness of the outer race, the outer race further comprising a radial portion and an axial portion each forming a portion of the external face and the internal face of the outer race, wherein the axial portion extends axially from a radially outer end of the radial portion, and
    a wear race that is made of synthetic material and fastened to the outer race, wherein
    the wear race is overmoulded on the external face of the outer race, the external face being provided with at least one blind indentation, inside of which there extends a rib of complementary shape of the wear race, the at least one blind indentation comprising an end wall and first and second side edges, the end wall extending obliquely to an axis of rotation of the bearing and wherein a first axial end of the end wall is located on the external face of the radial portion and a second axial end of the end wall is located on the external face of the axial portion, the at least one blind indentation does not extend through the thickness of the outer race such that the at least one blind indentation is spaced from the internal face of the outer race, and wherein the first and second side edges of the at least one blind indentation delimit the end wall in a circumferential direction, each of the first and second side edges having a generally semi-circular shape.

2. The according to claim 1, wherein the end wall is set back with respect to the external face of the outer race, and the first and second side edges connect the end face to the external face.

3. The bearing according to claim 1, wherein the at least one blind indentation is obtained by local deformation of the material of the outer race.

4. The bearing according to claim 1, wherein at least one axial retention means is formed on the external face of the outer race in order to axially retain the wear race relative to the outer race by the wear race comprising a portion having a shape complementary to the at least one axial retention means.

5. The bearing according to claim 4, wherein the at least one axial retention means is separate from the at least one blind indentation.

6. An assembly comprising:
    the bearing according to claim 1; and
    an operating element supporting the bearing.

7. A bearing comprising:
    an inner race,
    an outer race, and
    a wear race that is made of synthetic material and fastened to one of the races, wherein
    the wear race is overmoulded on at least one face of the one of the races, the at least one face being provided with at least one blind indentation, inside of which there extends a rib of complementary shape of the wear race,
    wherein axial retention means is formed on the at least one face of the one of the races in order to axially retain the wear race relative to the one of the races, wherein the axial retention means is separate from the at least one blind indentation, and
    wherein the axial retention means includes an annular groove, inside of which there extends an annular lip of the wear race of complementary shape.

8. A bearing comprising:
    an inner race,
    an outer race, and
    a wear race that is made of synthetic material and fastened to one of the races, wherein
    the wear race is overmoulded on at least one face of the one of the races, the at least one face being provided with at least one blind indentation, inside of which there extends a rib of complementary shape of the wear race,
    wherein axial retention means is formed on the at least one face of the one of the races in order to axially retain the wear race relative to the one of the races by the wear race comprising a portion having a shape complementary to the axial retention means, and
    wherein the at least one blind indentation forms the axial retention means.

* * * * *